United States Patent
Wallace et al.

(10) Patent No.: US 8,255,360 B1
(45) Date of Patent: Aug. 28, 2012

(54) SYNCHRONIZATION OF DATABASE CHANGES AMONG MULTIPLE DEVICES

(75) Inventors: Alexander David Wallace, Sunnyvale, CA (US); Shawn Patrick Flisakowski, Cupertino, CA (US); Craig Matthew Milito, Sunnyvale, CA (US); Keith Walter Rauenbuehler, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 364 days.

(21) Appl. No.: 12/363,596

(22) Filed: Jan. 30, 2009

(51) Int. Cl.
   *G06F 17/30* (2006.01)
(52) U.S. Cl. ........................................ 707/620
(58) Field of Classification Search .................. 707/620, 707/621
   See application file for complete search history.

(56) References Cited

U.S. PATENT DOCUMENTS

| | | | |
|---|---|---|---|
| 5,926,816 A | 7/1999 | Bauer et al. | |
| 6,810,405 B1 * | 10/2004 | LaRue et al. | 707/613 |
| 7,149,761 B2 | 12/2006 | Cooke et al. | |
| 7,366,738 B2 | 4/2008 | Yorke et al. | |
| 7,774,307 B2 | 8/2010 | Ju et al. | |
| 7,809,682 B2 * | 10/2010 | Paterson et al. | 707/625 |
| 2006/0101082 A1 * | 5/2006 | Agrawal et al. | 707/200 |
| 2011/0161289 A1 | 6/2011 | Pei et al. | |

\* cited by examiner

*Primary Examiner* — Amy Ng
*Assistant Examiner* — Alexander Khong
(74) *Attorney, Agent, or Firm* — Fish & Richardson P.C.

(57) ABSTRACT

Methods, systems, and apparatus, including computer program products, for synchronizing database changes among multiple devices. In one aspect, a method includes determining one or more primary differences between a primary database and a local synchronization database; receiving, from a secondary device, one or more secondary differences associated with a secondary database; merging the primary differences and the secondary differences to generate a set of merged differences; providing the set of merged differences to the secondary device; receiving, from the secondary device, an acknowledgment indicating receipt of the set of merged differences; and updating the primary database in accordance with the set of merged differences after receipt of the acknowledgment. Further, at least one conflict can be detected between the primary differences and the secondary differences, and can be resolved prior to generating the set of merged differences.

24 Claims, 5 Drawing Sheets

SYNCHRONIZATION OF DATABASE CHANGES AMONG MULTIPLE DEVICES

TECHNICAL FIELD

The present disclosure relates to synchronizing databases between devices, such as a primary database on a host device and a secondary database on a remote device.

BACKGROUND

A database is a structured collection of records that are organized in accordance with a database model. A variety of database models have been developed, including relational, hierarchical, object, and network. Database management systems are implemented as software applications or environments that control the storage of and access to stored data in accordance with a supported model.

A database can be stored on a stand-alone computing device and accessed through requests, such as queries. Queries can be formatted in accordance with a structured language (query language). A database also can be stored on a computing device that is accessible to one or more other computing devices, such as over dedicated communications links or a network. In a distributed environment, multiple applications and/or users can access a database simultaneously. Thus, the corresponding database management system can be configured to maintain the integrity of the database, such as by locking records that are being accessed or by marking data that is being accessed by another user as read-only.

In some architectures, one or more replica databases can be provided. For example, multiple regional databases can be maintained that contain identical or substantially identical information. Replica databases can reduce the amount of processing performed by a single database server, ease bandwidth constriction, and provide greater fault tolerance. The replica databases can be synchronized periodically to ensure that the store data is consistent.

Recently, mobile databases have been developed that can be accessed over a network by mobile computing devices, such as laptops, personal digital assistants, and smart phones. Data from a master database can be downloaded to a mobile device and stored as a mobile database for use when a connection to the database server is unavailable. Data then can be added to, deleted from, or modified in the mobile database. Further, when a connection between the mobile device and the master database is reestablished, the databases can be synchronized.

SUMMARY

A primary database on a primary device and a corresponding secondary database on a secondary device can be synchronized in accordance with a fault tolerant process. The primary device and the secondary device each can be configured to locally determine changes that have occurred since the last synchronization operation. Further, the secondary device can be configured to communicate the changes in the secondary database to the primary device. The primary device can merge the changes in the primary database with the received changes in the secondary database to generate a set of merged changes. The merged changes further can be communicated to the secondary device. In order to reduce the possibility of corruption, the present inventors recognized that it was beneficial to postpone updating the primary database until after the secondary device confirms receipt of the set of merged changes.

The present inventors also recognized a need for maintaining a synchronization database at each of the primary device and the secondary device to facilitate synchronization. Further, the need to resolve conflicts between the changes to the secondary database and the changes to the primary database before finalizing the set of merged changes also was recognized. Additionally, the present inventors recognized the need to permit both real-time synchronization and time-delayed synchronization. Accordingly, the techniques and apparatus described here implement algorithms for determining one or more changes occurring since the previous synchronization to a primary database stored on a primary device and to a secondary database stored on a secondary device, and for synchronizing the primary and secondary databases in a fault tolerant manner based on a merged set of the determined changes.

In general, in one aspect, the subject matter can be implemented to include determining one or more primary differences between a primary database and a local synchronization database; receiving, from a secondary device, one or more secondary differences associated with a secondary database; merging the primary differences and the secondary differences to generate a set of merged differences; providing the set of merged differences to the secondary device; receiving, from the secondary device, an acknowledgment indicating receipt of the set of merged differences; and updating the primary database in accordance with the set of merged differences after receipt of the acknowledgment.

The subject matter also can be implemented to include comparing, at the secondary device, the secondary database with a secondary synchronization database to determine the one or more secondary differences. Further, the subject matter can be implemented to include updating the local synchronization database in accordance with the set of merged differences, wherein the local synchronization database is updated before the primary database. Additionally, the subject matter can be implemented such that the primary database is updated in substantially real-time.

The subject matter also can be implemented such that merging further includes detecting at least one conflict between the primary differences and the secondary differences. Further, the subject matter can be implemented to include resolving the at least one conflict prior to generating the set of merged differences. The subject matter also can be implemented such that the secondary database comprises a subset of the primary database. Additionally, the subject matter can be implemented such that providing the set of merged differences further includes transmitting the set of merged differences to the secondary device over a wireless communications path.

In general, in another aspect, the techniques can be implemented as a computer program product, encoded on a computer-readable medium, operable to cause data processing apparatus to perform operations including determining one or more primary differences between a primary database and a local synchronization database; receiving, from a secondary device, one or more secondary differences associated with a secondary database; merging the primary differences and the secondary differences to generate a set of merged differences; providing the set of merged differences to the secondary device; receiving, from the secondary device, an acknowledgment indicating receipt of the set of merged differences; and updating the primary database in accordance with the set of merged differences after receipt of the acknowledgment.

The subject matter also can be implemented to be further operable to cause data processing apparatus to perform operations including comparing, at the secondary device, the secondary database with a secondary synchronization database to determine the one or more secondary differences. Also, the subject matter can be implemented to be further operable to cause data processing apparatus to perform operations including updating the local synchronization database in accordance with the set of merged differences, wherein the local synchronization database is updated before the primary database. Additionally, the subject matter can be implemented to be further operable to cause data processing apparatus to perform operations including updating the primary database in substantially real-time.

The subject matter also can be implemented to be further operable to cause data processing apparatus to perform operations including detecting at least one conflict between the primary differences and the secondary differences. Also, the subject matter can be implemented to be further operable to cause data processing apparatus to perform operations including resolving the at least one conflict prior to generating the set of merged differences. Further, the subject matter can be implemented such that the secondary database comprises a subset of the primary database. Additionally, the subject matter can be implemented to be further operable to cause data processing apparatus to perform operations including transmitting the set of merged differences to the secondary device over a wireless communications path.

In general, in another aspect, the subject matter can be implemented as a system including a secondary device including a secondary database stored on a storage device and a primary device communicatively coupled to the secondary device and including a primary database and a local synchronization database stored on a storage device, wherein the primary device further includes processor electronics configured to perform operations including determining one or more primary differences between the primary database and the local synchronization database; receiving, from the secondary device, one or more secondary differences associated with the secondary database; merging the primary differences and the secondary differences to generate a set of merged differences; transmitting the set of merged differences to the secondary device; receiving, from the secondary device, an acknowledgment indicating receipt of the set of merged differences; and updating the primary database in accordance with the set of merged differences after receipt of the acknowledgment.

The subject matter also can be implemented such that the secondary device further includes processor electronics configured to perform operations including comparing the secondary database with a secondary synchronization database to determine the one or more secondary differences. Also, the subject matter can be implemented such that the processor electronics are further configured to perform operations including updating the local synchronization database in accordance with the set of merged differences, wherein the local synchronization database is updated before the primary database. Additionally, the subject matter can be implemented such that the processor electronics are further configured to perform operations including updating the primary database in substantially real-time.

The subject matter also can be implemented such that the secondary device further includes processor electronics configured to perform operations including detecting at least one conflict between the primary differences and the secondary differences. Also, the subject matter can be implemented such that the processor electronics are further configured to perform operations including resolving the at least one conflict prior to generating the set of merged differences. Further, the subject matter can be implemented such that the secondary database comprises a subset of the primary database. Additionally, the subject matter can be implemented such that the primary device further includes a transmitter configured to transmit the set of merged differences to the secondary device over a wireless communications path.

The techniques described in this specification can be implemented to realize one or more of the following advantages. For example, the techniques can be implemented such that a primary database and a secondary database can be synchronized in real-time to reflect individual changes. The techniques also can be implemented to permit generating a merged set of changes reflecting the differences between the primary database and the secondary database. Further, synchronization of the primary database and the secondary database can be postponed until both the primary device and the secondary device have a copy of the merged set of changes. Additionally, the techniques can be implemented to permit reducing the amount of data transmitted between the primary device and the secondary device to perform a synchronization. The techniques also can be implemented such that the majority of processing can be performed by the device with greater available processing resources. The techniques further can be implemented to permit resolving one or more conflicts between changes to the primary and secondary databases automatically or manually.

The details of one or more implementations are set forth in the accompanying drawings and the description below. Other features and advantages will be apparent from the description and drawings, and from the claims.

BRIEF DESCRIPTION OF THE DRAWINGS

Like reference symbols indicate like elements throughout the specification and drawings.

DETAILED DESCRIPTION

Figure 1:
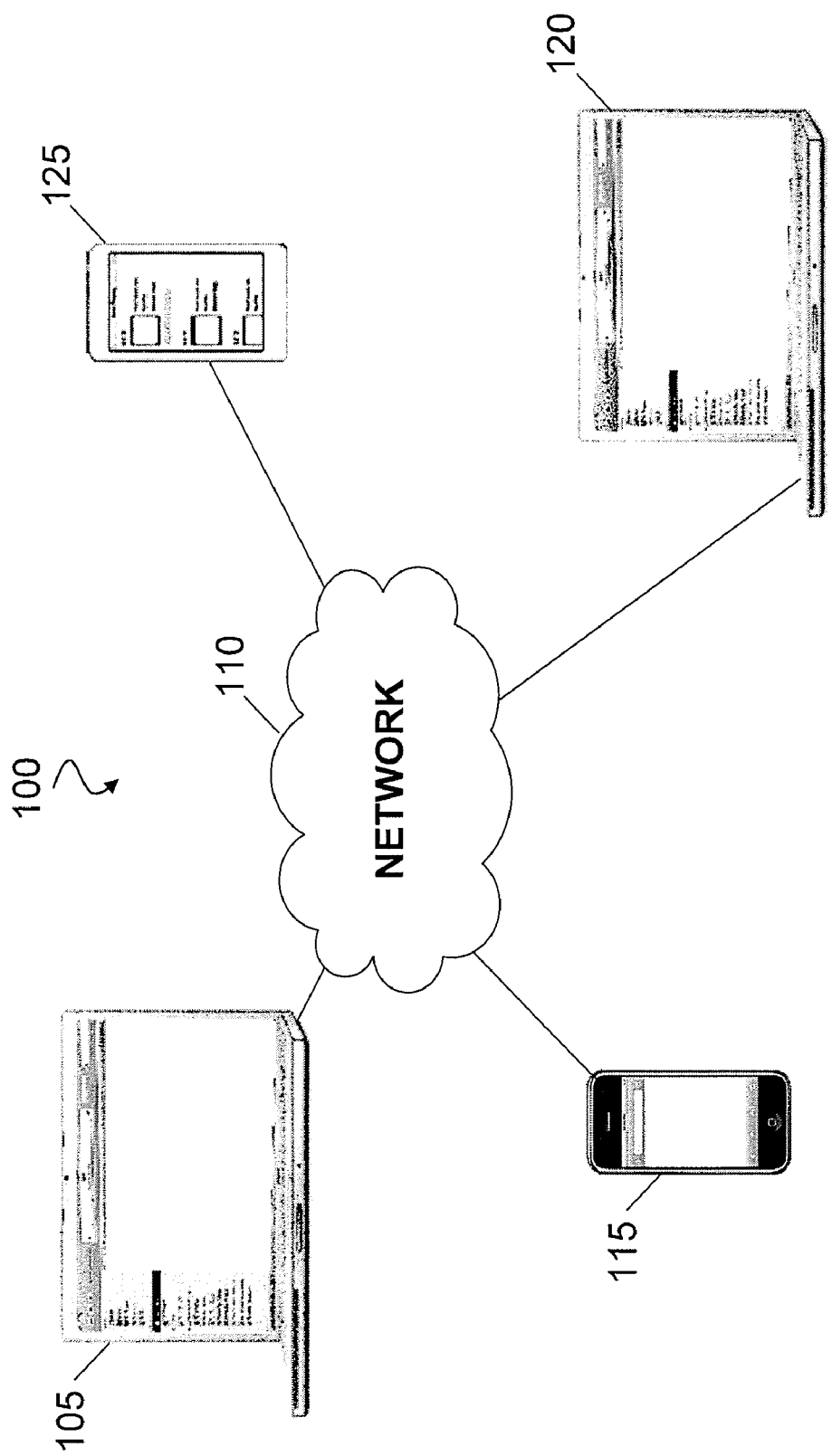
FIG. 1 shows an exemplary computing environment including a primary device and a plurality of secondary devices.

FIG. 1 shows an exemplary computing environment 100 including a primary device 105, e.g. a laptop computer, and a plurality of secondary devices 115, 120, and 125. The primary device 105 can be any portable or non-portable computing device with an associated storage device (not shown) for storing electronic files, including a plurality of databases. The primary device 105 can be configured to store a primary database associated with an application, such as a photo editor or a media player. The primary database can be configured to organize any data, including media such as images, music, and/or video. Further, the primary database can be implemented using any custom or commercially available database application.

The primary device 105 also can be configured to store a local synchronization database that reflects the state of the most recent synchronization with a corresponding secondary database. The local synchronization database can be created the first time the primary database is synchronized with a corresponding secondary database. The local synchronization database can be persistently stored on the primary device 105. Additionally, the primary device 105 can be configured to host and execute a synchronization application or framework. The synchronization application or framework can be configured to cooperatively execute a database synchronization process between the primary database and a secondary database stored on a secondary device.

The primary device 105 can be connected to a network 110 through a wired or wireless connection. The network 110 can be a public network, such as the internet, a private network, such as a local area network ("LAN"), or a combination thereof. Additionally or alternatively, the primary device 105 can be configured to communicate bi-directionally with a secondary device over a direct wireless connection, such as a radio-frequency or infra-red connection. The communications connection between the primary device 105 and a secondary device also can be encrypted or unencrypted.

A secondary device also can be any portable or non-portable computing device with an associated storage device (not shown) for storing electronic files, including a plurality of databases. Any number of secondary devices can be included in a computing environment. For example, the secondary devices in the computing environment 100 can include a mobile telephone 115, e.g. a smart phone, a laptop computer 120, and a personal media player 125.

A secondary device, e.g., the mobile telephone 115, also can be configured to store a secondary database associated with an application. Further, the secondary database stored on the secondary device can correspond to the primary database stored on the primary device 105. For example, a secondary database stored on the mobile telephone 115 can correspond to the primary database stored on the primary device 105, with each database organizing a related collection of photographs. In some implementations, the secondary database can be a complete copy of the primary database. In other implementations, the secondary database can be a subset of the primary database. For example, the secondary database can store fewer fields than the primary database. Also, the secondary database can include media of lower resolution than the primary database. During operation, e.g. execution of an associated application, the primary database and a corresponding secondary database can be independently altered. In the computing environment 100, any number of secondary devices can store a secondary database corresponding to the primary database stored on the primary device 105. Moreover, a secondary device also can be a primary device with respect to another database. For example, the laptop computer 120 can be both a secondary device with respect to a first database and a primary device with respect to a second database.

Each secondary device, e.g. the mobile telephone 115, also can be configured to store a local synchronization database that reflects the state of the corresponding secondary database at the time it was last synchronized. The local synchronization database can be created the first time the primary database is synchronized with the secondary device. The local synchronization database of the secondary device is equivalent to the corresponding local synchronization database of the primary device. The local synchronization database can be persistently stored on the secondary device. Each of the secondary devices also can be configured to host and execute a synchronization application or framework. In some implementations, the synchronization application or framework can be identical to that of the primary device 105. In some other implementations, the synchronization application or framework can include more, less, or different functionality that that of the primary device 105.

Each secondary device also can be connected to the network 110 through a wired or wireless connection. Further, a secondary device, e.g., the mobile telephone 115, can be configured to communicate bi-directionally with the primary device 105 over a direct wireless connection. The capabilities of the secondary devices included in the computing environment 100 can vary with one or more resources, such as processing power and storage.

Figure 2:
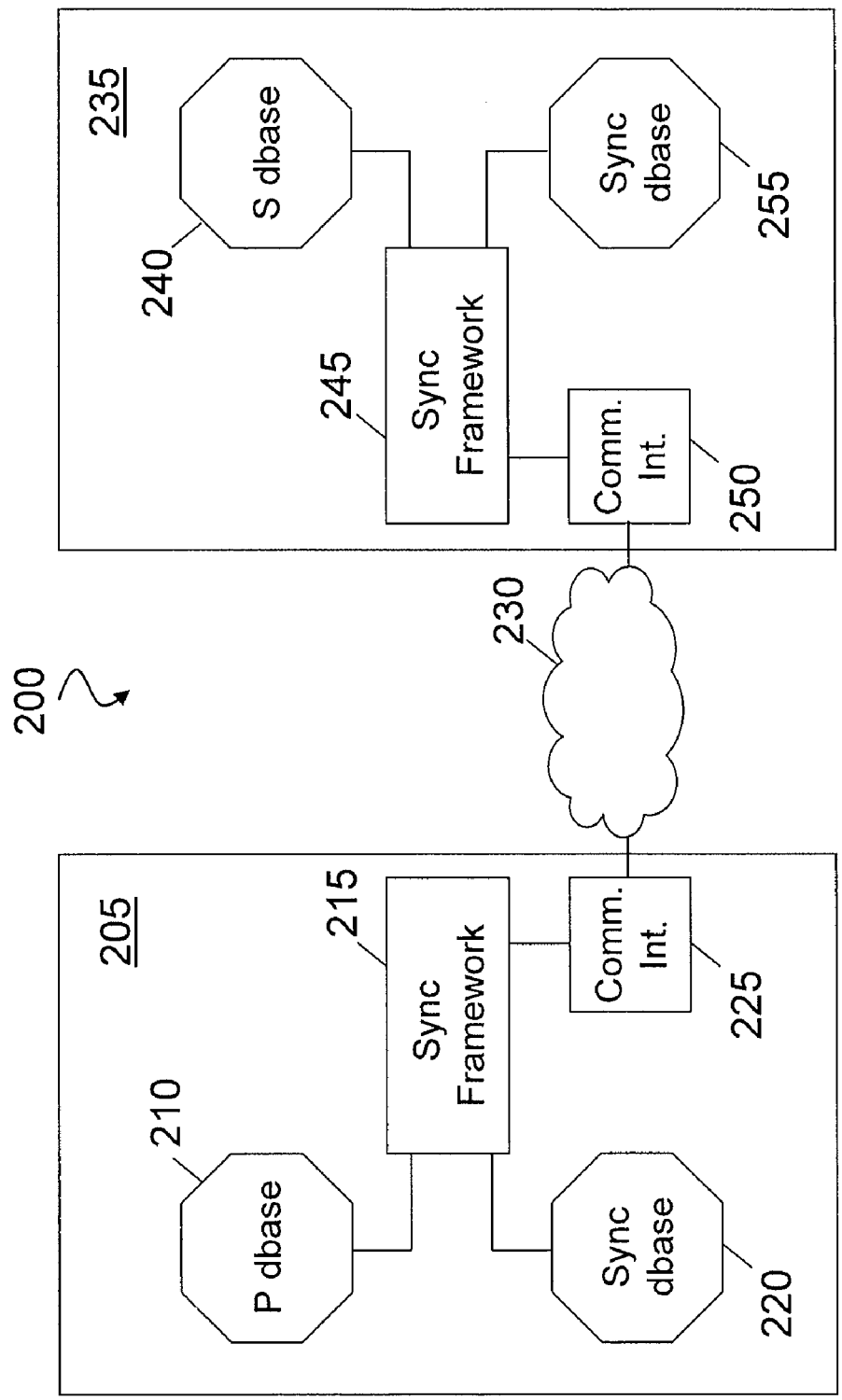
FIG. 2 shows an exemplary computing architecture for database synchronization between a primary device and a secondary device.

FIG. 2 shows an exemplary computing architecture 200 for database synchronization between a primary device 205 and a secondary device 235. The primary device 205 and the secondary device 235 each can be any portable or non-portable computing device with an associated storage device (not shown) for storing electronic files, including a plurality of databases. The storage device can be internal or external, and also can be a logical device implemented using a plurality of internal and/or external storage devices. Further, the storage device can be implemented using any non-volatile (or "persistent") storage that can be configured to store files, including a magnetic disk drive and a solid-state memory, such as a flash-based drive.

The primary device 205 can include a primary database 210, which can be associated with an application hosted on the primary device 205. The primary database can be configured to organize any data, including media such as images, music, and/or video. Further, the database can be implemented using any custom or commercially available database application.

In one example, the primary database can be configured to organize a collection of photographs. The primary database can include reference data identifying each photograph in the collection, such as by storage address. Thus, the size of the primary database can be small relative to the size of the corresponding media. Alternatively, the primary database can include each photograph in the collection. Further, the primary database can include metadata associated with one or more of the photographs in the collection. The metadata can be any data associated with a single photograph, a group of photographs, or the entire collection. For example, the metadata can include contextual information describing the photograph, such as the time, date, and location associated with the photograph. The metadata also can include user preference information, such as a rating associated with the photograph. Further, the metadata can include editing information, such as a crop applied to the photograph.

The primary device 205 also can include a primary synchronization database 220. The primary synchronization database 220 can be persistently stored on the primary device 205. The primary synchronization database 220 can reflect the state of the most recent synchronization with a corresponding secondary database, e.g. the secondary database 240.

Further, the primary device 205 can include a synchronization framework 215. The synchronization framework 215 can be implemented in software, hardware, or a combination thereof. The synchronization framework 215 can be configured to cooperatively execute a database synchronization process with one or more corresponding secondary devices. For example, the synchronization framework 215 of the primary device 205 can manage the communications with a secondary device, e.g. the secondary device 235, and the processing performed by the primary device 205 in synchronizing the primary database 210 with a corresponding secondary database, e.g. the secondary database 240.

Additionally, the primary device 205 can include a communication interface 225 configured to permit the primary device 205 to communicate with one or more other devices, e.g. the secondary device 235. The communication interface 225 can be adapted to permit the primary device 205 to communicate bi-directionally over a network, and can include a wired and/or wireless interface. The communication interface 225 also can be adapted to permit the primary device 205 to communicate directly with one or more other devices, e.g. the secondary device 235. For example, the communication interface 225 can support bi-directional wireless communication over a point-to-point communications pathway, such as using radio-frequency or infrared transmissions. Similarly, the communications pathway 300 between the primary device 205 and the secondary device 235 can be indirect, e.g. a network, or direct, e.g. a point-to-point connection.

The secondary device 235 can include a secondary database 240, which can be associated with an application hosted on the secondary device 240. The secondary database 240 can correspond to the primary database 210. In some implementations, the secondary database 240 can be a copy of the primary database 210, and can include substantially the same data. In some other implementations, the secondary database 240 can partially overlap with the primary database 210. For example, the secondary database 240 can represent a subset of the primary database 210. During operation of either or both of the primary device 205 and the secondary device 235, e.g. execution of an associated application, the primary database 210 and the corresponding secondary database 240 can be independently altered. Thus, the primary database 210 and the secondary database 240 can include one or more corresponding records for which the data differs.

Further, the secondary device 235 can include a secondary synchronization database 255. The secondary synchronization database 255 can be persistently stored on the secondary device 235. The secondary synchronization database 255 can reflect the state of the secondary database 240 at the time of the last synchronization operation. In some implementations, the secondary synchronization database 255 can be a complete copy of the secondary database 240. In other implementations, the secondary synchronization database 255 can be a reduced data representation of the secondary database 240. In the event the secondary database 240 is corrupted, the secondary synchronization database 255 can be used to restore it to the state of the last synchronization.

Additionally, the secondary device 235 can include a synchronization framework 245 and a communication interface 250 that are compatible with the synchronization framework 215 and communication interface 225 of the primary device 205. In some implementations, the synchronization framework 245 can be functionally the same as the synchronization framework 215 of the primary device 205. In other implementations, the synchronization framework 245 can be configured to include more, less, or different functionality than that of the synchronization framework 215 of the primary device 205. For example, the secondary device 235 can have one or more processing limitations and can thus be configured to perform only a subset of the synchronization functions.

The communication interface 250 of the secondary device 235 can include a wired and/or wireless interface adapted to permit the secondary device 235 to communicate bi-directionally over a network. Additionally or alternatively, the communication interface 250 can be adapted to communicate directly with one or more other devices, e.g. the primary device 205. For example, the communication interface 250 can support bi-directional wireless communication over a point-to-point communications pathway using radio-frequency or infrared transmissions.

In operation, the primary device 205 and the secondary device 235 can communicate over the communications pathway 230. Communication between the devices can be initiated by either device. For example, the secondary device 235 can be configured to contact the primary device 205 whenever communication is possible. Further, a synchronization operation, e.g. as described in FIGS. 3 and 4, can be initiated by either device, such as in response to the determining that a connection has been established. The synchronization operation can be performed cooperatively between the primary device 205 and the secondary device 235. Additionally, if the respective synchronization frameworks are equivalent, the synchronization operation can be mediated by either device. Otherwise, the synchronization operation can be mediated by the more capable device.

Figure 3:
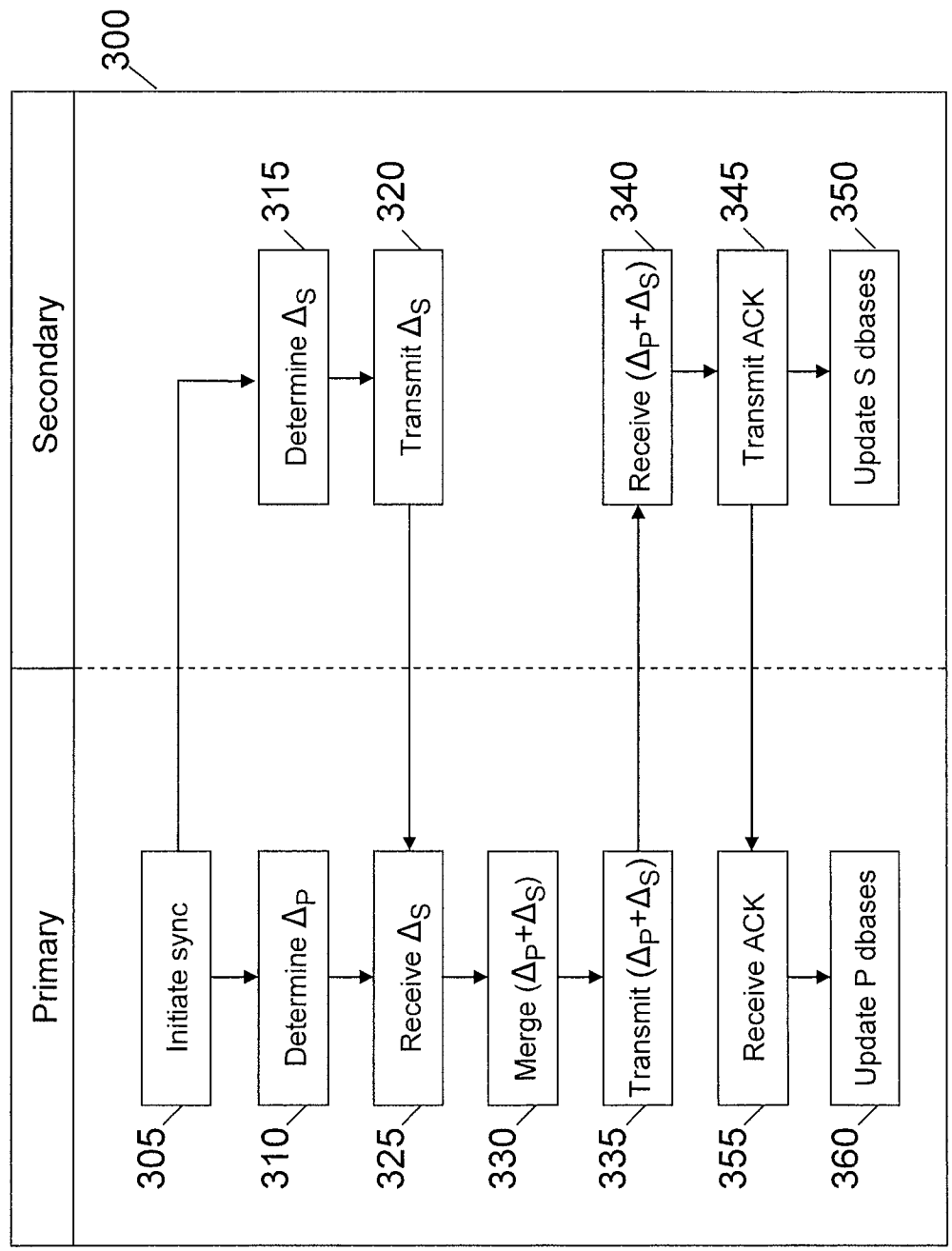
FIG. 3 shows an exemplary swim lane diagram describing a database synchronization operation.

FIG. 3 shows an exemplary swim lane diagram describing a database synchronization operation 300. The synchronization operation can be initiated 305 at the primary device. Upon initiation, the primary device can determine the differences, $\Delta_P$, between the primary database and the primary synchronization database (310). Further, the primary device can signal the secondary device to determine the differences, $\Delta_S$, between the secondary database and the secondary synchronization database (315). In other implementations, the synchronization operation can be initiated at the secondary device. In such implementations, the secondary device can signal the primary device to determine the differences ($\Delta_P$) between the primary database and the primary synchronization database. Further, in some implementations, either of the devices with a corresponding database can be the primary device and the other device can be the secondary device.

Once determined, the secondary device can transmit to the primary device any differences, $\Delta_S$, between the secondary database and the secondary synchronization database (320). The primary device can receive the determined differences $\Delta_S$ from the secondary device (325). Further, the primary device can merge the differences ($\Delta_P$) determined locally with the differences ($\Delta_S$) received from the secondary device (330). The primary device can then transmit the merged differences ($\Delta_P + \Delta_S$) to the secondary device (335). The secondary device receives the transmission from the primary device and extracts the merged differences (340). Alternatively, the primary device can transmit any differences, $\Delta_P$, between the primary database and the primary synchronization database to the secondary device, which can generate the merged differences and transmit them back to the primary device. The determination as to which device will generate the merged differences can be based on default criteria or operational criteria, such as available resources.

Further, the secondary device can transmit an acknowledgement message to the primary device to indicate that the merged differences were received (345). Also, the secondary device can update the secondary database and the secondary synchronization database in accordance with the merged differences (350). The primary device can receive the acknowledgement message from the secondary device (355). Once the primary device has received the acknowledgement, the primary device can update the primary database and the primary synchronization database in accordance with the merged differences (360). Thus, the corresponding information stored in the primary database and the secondary database should be the same. Also, the primary synchronization database, the secondary database, and the secondary synchronization database all can be substantially identical.

Figure 4:
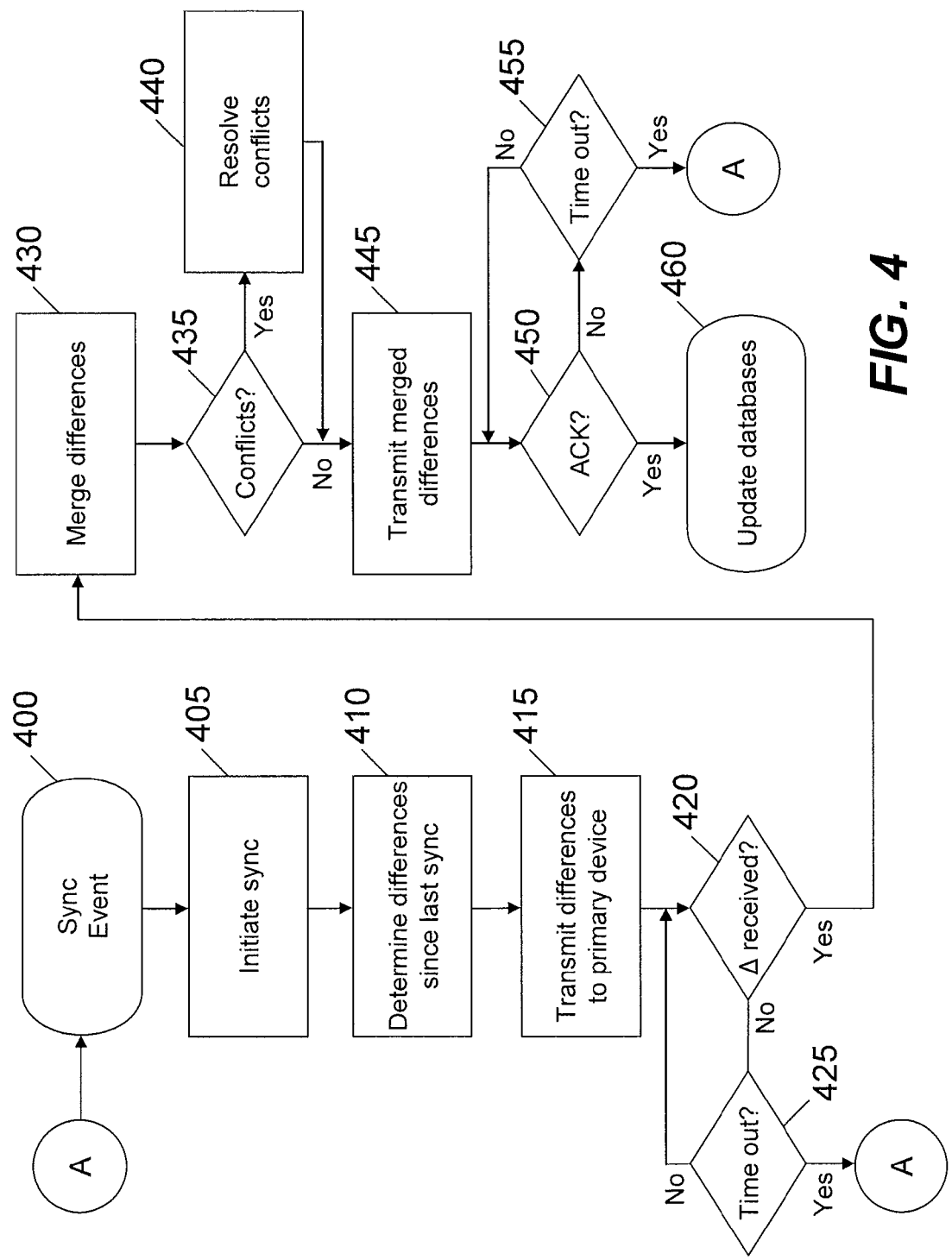
FIG. 4 shows a flow diagram describing an exemplary process for synchronizing databases.

FIG. 4 shows a flow diagram describing an exemplary process for synchronizing databases between a primary device and a secondary device. The synchronization process can be performed based on the occurrence of a predetermined synchronization event (400). Any event can be selected to represent a synchronization event, such as user input selecting synchronization or failure of a previously attempted synchronization operation. Further, a plurality of synchronization events can be identified, any of which can cause a synchronization operation to be performed. Additionally, the synchronization event can occur at either or both of the primary device and the secondary device.

For example, in some implementations, detection of a communication connection between the primary and secondary devices can be a synchronization event. If a communication connection between the primary and secondary devices is newly established, all changes made to corresponding databases on either or both devices since the last synchronization operation can be determined and the databases can be synchronized. Similarly, if the communication connection persists, the synchronization process can be automatically performed upon detection of a change to either of the primary database and the secondary database. Thus, the change can be synchronized in substantially real-time while the communication connection is available.

The synchronization process can be initiated by either of the primary device and the secondary device (405). For example, the synchronization process can be initiated by the device that detects the occurrence of the synchronization event. Initiating the synchronization process can include transmitting a synchronization request or other such message to the corresponding device. For example, if the primary device initiates the synchronization process, the primary device can transmit a synchronization request to the corresponding secondary device.

The primary device and the secondary device each can determine the differences in the corresponding databases made after the most recent synchronization operation (410). For example, the primary device can maintain a primary synchronization database that reflects that last known synchronization state of the secondary database. The primary device can compare the current state of the primary database with the primary synchronization database to identify any differences ($\Delta_P$). Further, the secondary device can maintain a secondary synchronization database that reflects the last known synchronization state of the secondary database. The secondary device can compare the current state of the secondary database with the secondary synchronization database to identify any differences ($\Delta_S$).

The secondary device can transmit the locally determined differences to the primary device, i.e. the merging device (415). The determined differences can be transmitted in any form, including a reduced data format that decreases bandwidth usage. For example, the determined differences can be transmitted using an encoded dictionary that maps an object identifier to a corresponding property change. The secondary device can be configured to automatically transmit the differences in the secondary database when they have been determined. Alternatively, the secondary device can be configured to transmit the differences in the secondary database in response to a request from the primary device. In some implementations, either of the primary device and the secondary device can be selected to merge the differences. For example, the merging device can be selected based on one or more factors, such as available processing resources.

The primary device can determine whether the determined differences have been received from the secondary device (420). If an indication of the determined differences, including an indication that no differences were detected, has not been received, the primary device can determine whether a predetermined amount of time has passed (425). The predetermined amount of time can be selected as an amount of time indicating that the secondary device has been interrupted or the communication connection has been lost, e.g. 5, 30, or 60 seconds. For example, the communication connection between the primary and secondary devices can be subject to disruption. Alternatively or additionally, at least one of the primary device and the secondary device can be subject to processing interruptions. For example, the secondary device can be a mobile telephone that does not support background processes. As such, a synchronization operation can be suspended or abandoned in favor of a higher priority process.

If the predetermined amount of time has passed, the synchronization process can be terminated and the primary device can await occurrence of the next synchronization event. Alternatively, if the predetermined amount of time has not passed, the primary device can again assess whether the determined differences have been received from the secondary device (420). If the determined differences have been received from the secondary device, the primary device can merge the differences determined by the primary device ($\Delta_P$) with the differences determined by the secondary device ($\Delta_S$), to generate a set of merged differences ($\Delta_P+\Delta_S$) (430).

Further, the primary device can determine whether any conflicts exist in the differences determined by the primary device and the differences determined by the secondary device (435). In one example, a rating associated with an image can be changed on the primary device and a keyword associated with an image can be changed on the secondary device. The rating and keyword represent distinct changes and thus no conflict exists. In another example, a rating associated with an image can be changed on the primary device, e.g. from four stars to five stars, and a rating associated with the same image can be changed on the secondary device, e.g. from four stars to three stars. Because the rating changes are associated with the same image and represent different values, the difference associated with the primary database conflicts with the corresponding difference associated with the secondary database.

If the differences determined by the primary device and the differences determined by the secondary device include one or more conflicts, the conflicts can be resolved in accordance with one or more conflict policies (440). In some instances, conflicts can be resolved automatically by applying one or more rules. For example, the most recent change can be selected or the current value of associated with the primary database can be selected over the current value associated with the secondary database. In some other instances, conflicts can be resolved manually, such as by presenting choices to a user and receiving input selecting a particular resolution.

Once any conflicts have been resolved, or in the absence of any conflicts, merger of the differences can be completed and the merged differences can be transmitted to the secondary device (445). The merged differences also can be transmitted in any form, including by using an encoded dictionary that maps an object identifier to a corresponding property change.

Further, the primary device can determine whether the secondary device has acknowledged receipt of the merged differences (450). If an acknowledgment has not been received from the secondary device, the primary device can determine whether a predetermined amount of time has passed (455). The predetermined amount of time can indicate the amount of time within which an acknowledgment is expected, such as if the secondary device is operating properly and the communication connection is still active. If the predetermined amount of time has not passed, the primary device can continue to determine whether the secondary device has acknowledged receipt of the merged differences (450). If the predetermined amount of time has passed, the primary device can terminate the synchronization process and wait for the occurrence of the next synchronization event. Alternatively, one or more error recovery mechanisms can be utilized instead of terminating the synchronization process. In one example, the primary device can retransmit the merged differences one or more times before terminating the synchronization process. In another example, the primary device can attempt to determine how much of the merged differences information was received and transmit the remaining portion when the secondary device and communication connection are stable.

Once the secondary device has acknowledged receipt of the merged differences, the merged differences can be applied at both the primary and secondary devices (460). In some implementations, the merged differences can be applied to the primary database and the secondary database before the merged differences are applied to the corresponding synchronization databases. In some other implementations, the merged differences can be applied to the primary synchronization database and the secondary synchronization database before the merged differences are applied to the primary and secondary databases. After the synchronization operation, the secondary database again represents a copy or subset of the corresponding primary database. Further, the secondary database, the secondary synchronization database, and the primary synchronization database all are substantially identical, with respect at least to content.

Because the primary and secondary databases are not modified during the synchronization process until the merged differences are available on both the primary and secondary devices, a synchronization operation can be restarted, rolled back, or canceled in the event of any failure during the synchronization operation. Additionally, because the primary synchronization database and the secondary synchronization database are both substantially identical to the secondary database immediately after a synchronization operation, with respect at least to content, the secondary database can be recovered at any time in the event of corruption.

Figure 5:
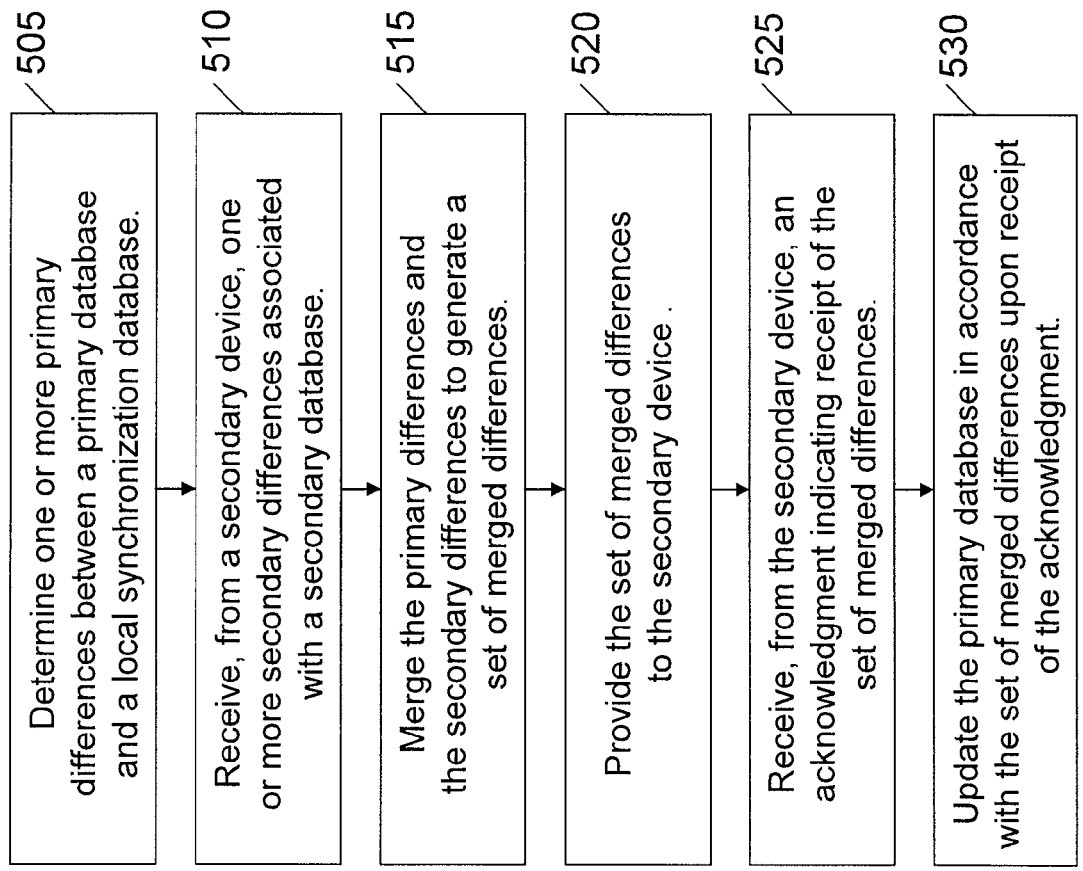
FIG. 5 shows a flow diagram describing an exemplary process for synchronizing a primary database with a secondary database.

FIG. 5 shows a flow diagram describing an exemplary process for synchronizing a primary database with a secondary database. Initially, one or more primary differences are determined between a primary database and a local synchronization database (505). Further, one or more secondary differences are received from a secondary device associated with a secondary database (510). The primary differences and the secondary differences are merged to generate a set of merged differences (515). The set of merged differences further are provided to the secondary device (520). An acknowledgment indicating receipt of the set of merged differences is received from the secondary device (525). After the acknowledgment is received, the primary database is updated in accordance with the set of merged differences (530).

The processes described above can be implemented in a computer-readable medium tangibly encoding software instructions which are executable, for example, by one or more computers to cause the one or more computers or one or more data processing apparatus to perform the operations described here. In addition, the techniques can be implemented in a system including one or more computers and the computer-readable medium.

Implementations of the subject matter and the functional operations described in this disclosure can be implemented in digital electronic circuitry, or in computer software, firmware, or hardware, including the disclosed structures and their structural equivalents, or in combinations of one or more of them. Implementations of the subject matter described in this disclosure can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a random or serial access memory device, or a combination of one or more of them.

The term "processing device" encompasses all apparatus, devices, and machines for processing data, including a programmable processor, a computer, or multiple processors or computers. The apparatus can include, in addition to hardware, code that creates an execution environment for the computer program, e.g., code that constitutes processor firmware, a protocol stack, a database management system, an operating system, and/or a combination of one or more of them.

A number of implementations have been disclosed herein. Nevertheless, it will be understood that various modifications may be made without departing from the spirit and scope of the claims. Accordingly, other implementations are within the scope of the following claims.

What is claimed is:

1. A computer-implemented method of synchronizing databases, the method comprising the steps of:
   first, determining, by a primary device, one or more primary differences between a primary database and a local synchronization database associated with the primary device;
   second, receiving, at the primary device from a secondary device, one or more secondary differences associated with a secondary database;
   third, merging, at the primary device, the primary differences and the secondary differences to generate a set of merged differences;
   fourth, providing, by the primary device, the set of merged differences to the secondary device;
   fifth, receiving, at the primary device, an acknowledgment from the secondary device indicating receipt of the set of merged differences by the secondary device, where the acknowledgment is distinct from the secondary differences; and
   sixth, updating the primary database in accordance with the set of merged differences after receipt of the acknowledgment.

2. The computer-implemented method of claim 1, further comprising:
   comparing, at the secondary device, the secondary database with a secondary synchronization database to determine the one or more secondary differences.

3. The computer-implemented method of claim 1, further comprising:
   updating the local synchronization database in accordance with the set of merged differences, wherein the local synchronization database is updated before the primary database.

4. The computer-implemented method of claim 1, wherein the primary database is updated in substantially real-time.

5. The computer-implemented method of claim 1, wherein merging further comprises:
   detecting at least one conflict between the primary differences and the secondary differences.

6. The computer-implemented method of claim 5, further comprising:
   resolving the at least one conflict prior to generating the set of merged differences.

7. The computer-implemented method of claim 1, wherein the secondary database comprises a subset of the primary database.

8. The computer-implemented method of claim 1, wherein providing the set of merged differences further comprises:
transmitting the set of merged differences to the secondary device over a wireless communications path.

9. A computer program product, encoded on a non-transitory computer-readable medium, operable to cause data processing apparatus to perform operations comprising the steps of:
first, determining, by a primary device, one or more primary differences between a primary database and a local synchronization database associated with the primary device;
second, receiving, at the primary device from a secondary device, one or more secondary differences associated with a secondary database;
third, merging, at the primary device, the primary differences and the secondary differences to generate a set of merged differences;
fourth, providing, by the primary device, the set of merged differences to the secondary device;
fifth, receiving, at the primary device, an acknowledgment from the secondary device indicating receipt of the set of merged differences by the secondary device, where the acknowledgment is distinct from the secondary differences; and
sixth, updating the primary database in accordance with the set of merged differences after receipt of the acknowledgment.

10. The computer program product of claim 9, further operable to cause data processing apparatus to perform operations comprising:
comparing, at the secondary device, the secondary database with a secondary synchronization database to determine the one or more secondary differences.

11. The computer program product of claim 9, further operable to cause data processing apparatus to perform operations comprising:
updating the local synchronization database in accordance with the set of merged differences, wherein the local synchronization database is updated before the primary database.

12. The computer program product of claim 9, further operable to cause data processing apparatus to perform operations comprising:
updating the primary database in substantially real-time.

13. The computer program product of claim 9, further operable to cause data processing apparatus to perform operations comprising:
detecting at least one conflict between the primary differences and the secondary differences.

14. The computer program product of claim 13, further operable to cause data processing apparatus to perform operations comprising:
resolving the at least one conflict prior to generating the set of merged differences.

15. The computer program product of claim 9, wherein the secondary database comprises a subset of the primary database.

16. The computer program product of claim 9, further operable to cause data processing apparatus to perform operations comprising:
transmitting the set of merged differences to the secondary device over a wireless communications path.

17. A system comprising:
a secondary device including a secondary database stored on a storage device; and
a primary device communicatively coupled to the secondary device and including a primary database and a local synchronization database stored on a storage device, wherein the primary device further includes processor electronics configured to perform operations comprising the steps of:
first, determining one or more primary differences between the primary database and the local synchronization database associated with the primary device;
second, receiving, from the secondary device, one or more secondary differences associated with the secondary database;
third, merging the primary differences and the secondary differences to generate a set of merged differences;
fourth, transmitting the set of merged differences to the secondary device;
fifth, receiving, from the secondary device, an acknowledgment indicating receipt of the set of merged differences by the secondary device, where the acknowledgement is distinct from the secondary differences; and
sixth, updating the primary database in accordance with the set of merged differences after receipt of the acknowledgment.

18. The system of claim 17 wherein the secondary device further includes processor electronics configured to perform operations comprising:
comparing the secondary database with a secondary synchronization database to determine the one or more secondary differences.

19. The system of claim 17, wherein the processor electronics are further configured to perform operations comprising:
updating the local synchronization database in accordance with the set of merged differences, wherein the local synchronization database is updated before the primary database.

20. The system of claim 17, wherein the processor electronics are further configured to perform operations comprising:
updating the primary database in substantially real-time.

21. The system of claim 17, wherein the processor electronics are further configured to perform operations comprising:
detecting at least one conflict between the primary differences and the secondary differences.

22. The system of claim 21, wherein the processor electronics are further configured to perform operations comprising:
resolving the at least one conflict prior to generating the set of merged differences.

23. The system of claim 17, wherein the secondary database comprises a subset of the primary database.

24. The system of claim 17, wherein the primary device further includes:
a transmitter configured to transmit the set of merged differences to the secondary device over a wireless communications path.

* * * * *